United States Patent

Hashimoto et al.

[11] Patent Number: 6,048,142
[45] Date of Patent: *Apr. 11, 2000

[54] PROFILING METHOD

[75] Inventors: Takeshi Hashimoto, Kyoto; Hiroyuki Fukuhara; Akiyasu Yonekawa, both of Otsu; Yoshimi Yotutani, Omihachiman, all of Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/072,753

[22] Filed: Jun. 7, 1993

[30] Foreign Application Priority Data

Jun. 10, 1992 [JP] Japan ................................. 4-150315
Jun. 10, 1992 [JP] Japan ................................. 4-150316

[51] Int. Cl.$^7$ ........................................................ B23C 3/12
[52] U.S. Cl. ............................................ 409/132; 29/888.22
[58] Field of Search ................................ 409/132, 138, 409/126, 180, 131, 140; 29/888.022; 144/134 A, 371, 134 D, 253 D

[56] References Cited

U.S. PATENT DOCUMENTS

| | | | |
|---|---|---|---|
| 3,196,749 | 7/1965 | Zanni | 409/180 |
| 3,289,717 | 12/1966 | Dutot | 144/134 D |
| 3,360,023 | 12/1967 | Rutzebeck | 144/231 X |
| 4,338,052 | 7/1982 | Lockett | 409/206 |
| 4,601,619 | 7/1986 | Stinnett | 409/180 |
| 4,634,322 | 1/1987 | Walker | 409/138 |
| 4,637,775 | 1/1987 | Kato | 414/744 R |
| 4,669,923 | 6/1987 | McKinney | 144/371 |
| 4,844,135 | 7/1989 | Witt | 144/371 |
| 4,993,896 | 2/1991 | Dombrowski | 409/138 |
| 5,004,385 | 4/1991 | Kishi | 409/180 |
| 5,044,843 | 9/1991 | Velepec | 409/126 |

FOREIGN PATENT DOCUMENTS

| | | | |
|---|---|---|---|
| 33493 | 3/1978 | Japan | 409/140 |
| 157912 | 12/1981 | Japan | 409/140 |
| 223511 | 12/1983 | Japan | 409/140 |
| 259709 | 11/1987 | Japan | 409/140 |
| 4216902 | 8/1992 | Japan | 144/253 D |

OTHER PUBLICATIONS

Freasibility of a Compliant Piloted Deburring System for Precision Robotitic Deburring J.C. Schneider Apr. 1988.

*Primary Examiner*—William Briggs
*Attorney, Agent, or Firm*—Stevens, Davis, Miller & Mosher, L.L.P.

[57] ABSTRACT

In a profiling method, a shank section of a rotary tool which has a cutter and a rotatable journal bearing provided at a tip of a cutter, is chucked, and a spindle for driving the tool is resiliently supported in such a way as to be movable perpendicularly to the tool axis, the rotatable journal bearing being pressed against a surface of a workpiece to perform machining thereon by using the surface as a reference.

5 Claims, 6 Drawing Sheets

PROFILING METHOD

BACKGROUND OF THE INVENTION

This invention relates to a tool, machine and method for profiling.

FIG. 5 shows a sectional view of a conventional rotary tool for milling, and FIG. 6 shows a profiling method using a conventional tool and method. Such a conventional tool generally consists of a shank section 2 secured to the associated machine tool and a cutter 1 for machining a workpiece 4. When performing a machining operation such as chamfering, stepping, etc. with high accuracy on a workpiece to shape it in conformity with a reference finish surface 5 by using a conventional rotary tool as shown in the drawings, it has been necessary to perform such a machining operation while the workpiece is fixed on the same equipment as the one used for finishing the workpiece reference surface, or to accurately secure the workpiece in position on another equipment and then perform such machining on the workpiece.

When performing chamfering or stepping on a workpiece to shape it in conformity with a particularly complicated curved surface, the machining is generally performed while the workpiece is fixed on the same equipment as the one used for finishing the workpiece reference surface, or the workpiece is positioned with high accuracy on an equipment different from the one used for finishing the workpiece reference surface and then the machining is performed by using a machine equipped with a high-precision NC controller.

However, when, as shown in FIG. 3, chamfering is to be performed with high accuracy on an intermediate portion 6C between an upper surface 7C and a side surface 5C of a spiral wall, the chamfering has to be performed with the same equipment as that used in the finishing of the upper and side surfaces of this spiral wall, without releasing the chuck, with the result that the machining requires much time and necessitates an increase in equipment size and an enhancement in accuracy. There is a machining method available according to which wall-surface finishing and chamfering are conducted simultaneously by using a tool consisting of a combination of a wall-finishing tool and a cutter for chamfering. This method, however, has a problem in that when a strict dimensional precision is required, it is difficult to prepare the tool, which cannot be exactly shaped into a desired configuration, thus making it difficult to attain a high level of dimensional precision. On the other hand, when wall-surface finishing and chamfering are performed by separate processes, angular and center deviations with respect to the spiral configuration will be generated due to the re-chucking involved, thereby making it difficult to obtain a uniform, high-precision chamfered configuration. To achieve such a chamfered configuration, the workpiece must be positioned accurately, and the equipment precision must be enhanced, resulting in an increase in mounting time and costs.

Further, with the conventional methods, a high-precision, NC-controlled machine tool is required, resulting in a high equipment cost and much time being needed to design and mount jigs. Further, it has been impossible to perform profiling with high accuracy on surfaces such as casting surfaces, which exhibit a variation in configurational precision.

SUMMARY OF THE INVENTION

The present invention has been made with a view toward solving the above problems in the prior art. It is accordingly an object of this invention to enable profiling to be easily performed on a workpiece to shape it in conformity with an object having a complicated configuration.

In accordance with this invention, there is provided a profiling tool having a rotatable journal bearing at the tip of its cutter.

Further, the present invention provides a profiling machine wherein the shank section of the cutter of a rotary tool having a rotatable journal bearing at the tip of its cutter is chucked, and wherein a spindle for driving the tool is resiliently supported in such a way as to be movable perpendicularly to the axis of the tool.

Also, the present invention provides a profiling method wherein profiling is performed while pressing the above-mentioned rotatable journal bearing against a surface of the workpiece, which surface is used as a reference surface.

Still further, the present invention provides a chamfering/profiling method which enables profiling of an object having a complicated configuration, as in the case of chamfering of the tip of a scroll wrap, to be performed easily.

In accordance with this invention, the cutter is moved while pressing the peripheral section of the journal bearing, which is provided at the tip of the cutter, against a workpiece having a complicated configuration, so that a highly accurate profiling can be performed on the workpiece easily and at low cost, in conformity with the reference configuration, even when the workpiece is such that it involves a variation in terms of shape precision and positioning. Further, this invention enables machining to be performed easily and precisely even when the dimensional tolerance regarding the shape to be obtained in conformity with the configuration of the reference finish surface is strict.

DESCRIPTION OF THE PREFERRED EMBODIMENTS

Figure 1:
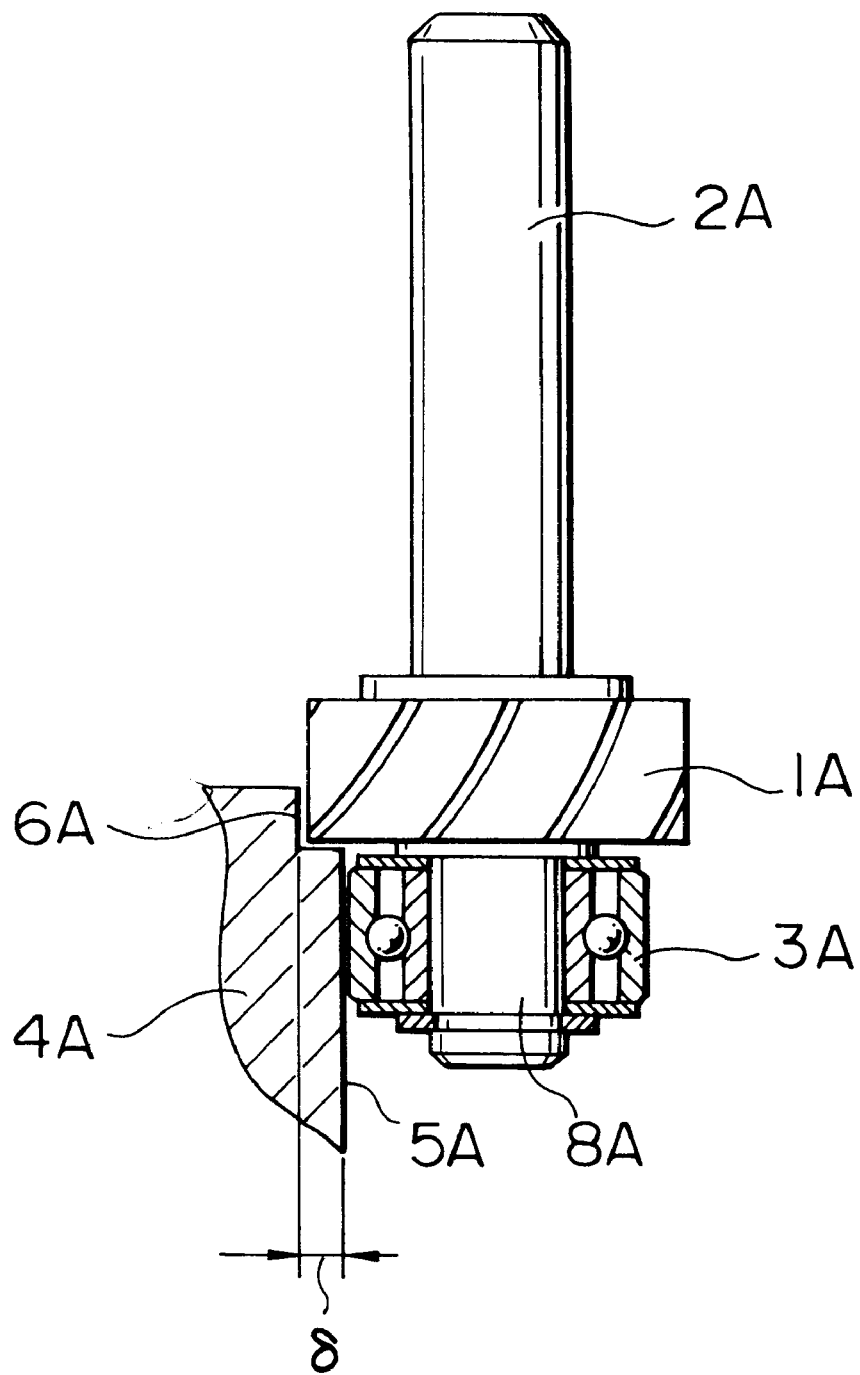
FIG. 1 is a sectional view of a rotary tool according to a first embodiment of this invention.

An embodiment of this invention will now be described with reference to the accompanying drawings. FIG. 1 is a sectional view of a rotary tool for stepping which includes a journal bearing, and FIG. 2 is a sectional view of a rotary tool for chamfering which also includes a journal bearing.

The tool shown in FIG. 1 is used to form a step section 6A by cutting the workpiece to a fixed depth of cut δ from a reference finish surface 5A. The tool has a cylindrical cutter 1A at the tip of a shank section 2A. Further, at the tip of the shank section 2A, the tool has a boss 8A which is coaxial with the shank section 2A. The inner ring of a ball bearing is inserted into the boss 8A and secured therein to form a rotatable journal bearing 3A. The cutter has a diameter which is larger than the outer diameter of the ball bearing by an amount corresponding to the predetermined depth of cut δ. This rotary tool is attached to a milling machine by chucking and is moved while the outer periphery of the ball bearing is pressed against the reference finish surface 5A, whereby the step surface 6A indented from the reference surface 5A by the fixed amount δ is formed with high accuracy in conformity with the reference surface 5A. While the tool moves around the workpiece, the outer peripheral surface of the journal bearing 3A is kept pressed against the reference surface 5A and remains in rolling contact therewith as it moves along. Due to this arrangement, the reference finish surface 5A remains unaffected by the cutting operation of the cutter 1A, which may be revolved at a speed as high as several thousand revolutions per minute, and is not damaged if the tool is pressed against it with a relatively large force.

Figure 2:
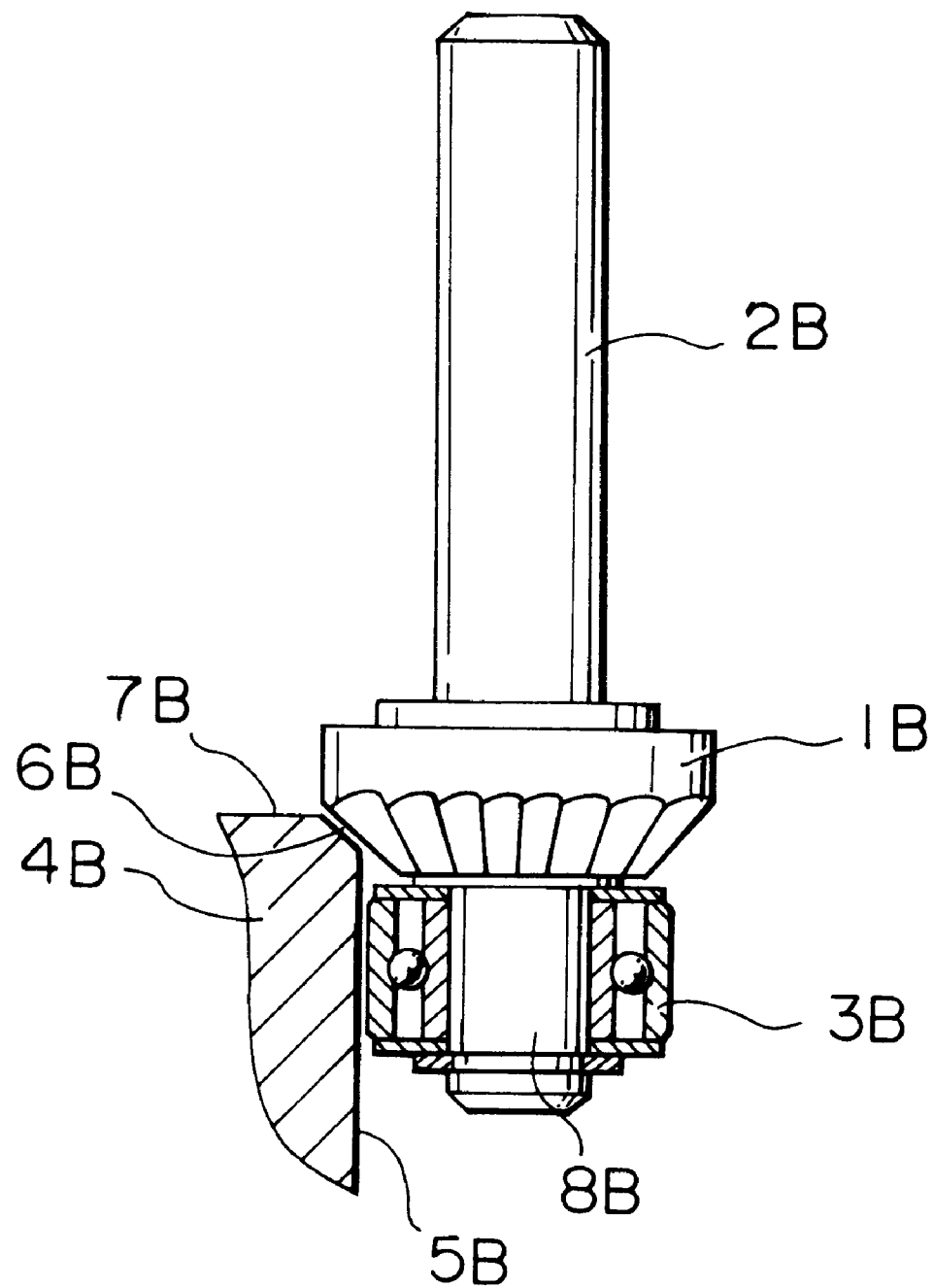
FIG. 2 is a sectional view of a rotary chamfering tool according to another embodiment of this invention.

FIG. 2 shows a rotary tool for performing high-precision chamfering (with a chamfering amount, for example, of 0.05 to 0.15 mm) on an intermediate portion between a reference finish surface 5B and an upper end surface 7B of a workpiece 4B. As in the case of the stepping described above, a cutter 1B is provided at the tip of a shank section 2B. The cutter 1B is formed as a truncated cone having a predetermined chamfering angle. Further, at the tip of the cutter 1B, there is provided a boss 8B which is coaxial with the shank section 2B. The inner ring of a ball bearing is inserted into this boss 8B and secured therein to form a rotatable journal bearing 3B.

Figure 3:
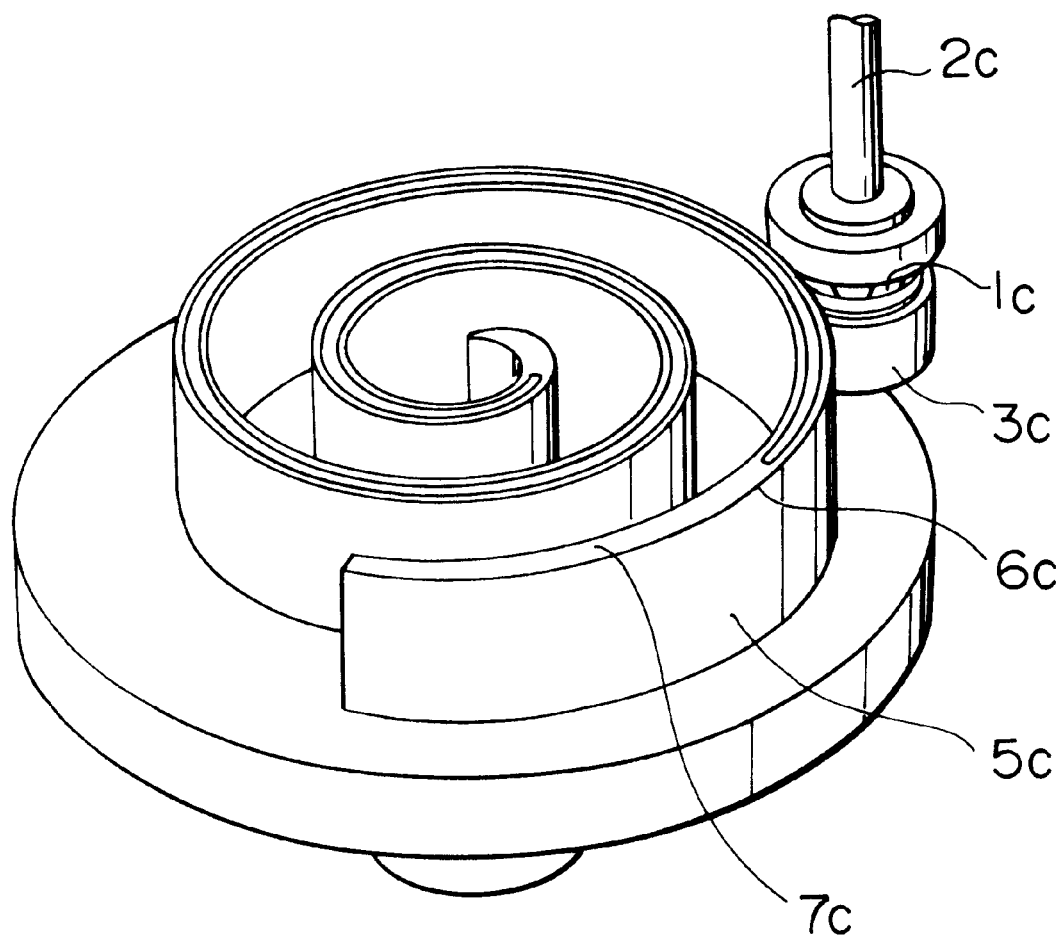
FIG. 3 is a perspective view showing how chamfering is performed on a spiral object by using a rotary chamfering tool according to this invention.

FIG. 3 shows how chamfering is performed, for example, on a spiral object by using the rotary chamfering tool of this invention as described above. The tool is attached to a milling machine by chucking and the outer peripheral surface of the ball bearing 3C is pressed against a side wall 5C which serves as the reference finish surface of the workpiece 4C. The vertical position of the tool is adjusted in accordance with the predetermined chamfering amount. In this condition, the tool is rotated and, at the same time, moved along the side wall 5C of the workpiece, whereby high-precision chamfering is automatically effected along the side wall 5C. Instead of moving the tool, it is also possible to move the workpiece 4C. As in the case of the stepping operation shown in FIG. 1, due to the presence of the rotatable journal bearing, it is possible for the tool to be pressed against the workpiece with an appropriate force without damaging the reference finish surface of the workpiece. Further, it is also possible to form only the cutter 1C of a high-precision tool material such as hard metal and fasten it to the shank section 2C by a screw, brazing or the like, mounting a journal bearing at the tip of the tool. This makes it possible to produce a chamfering tool at relatively low cost.

Figure 4:
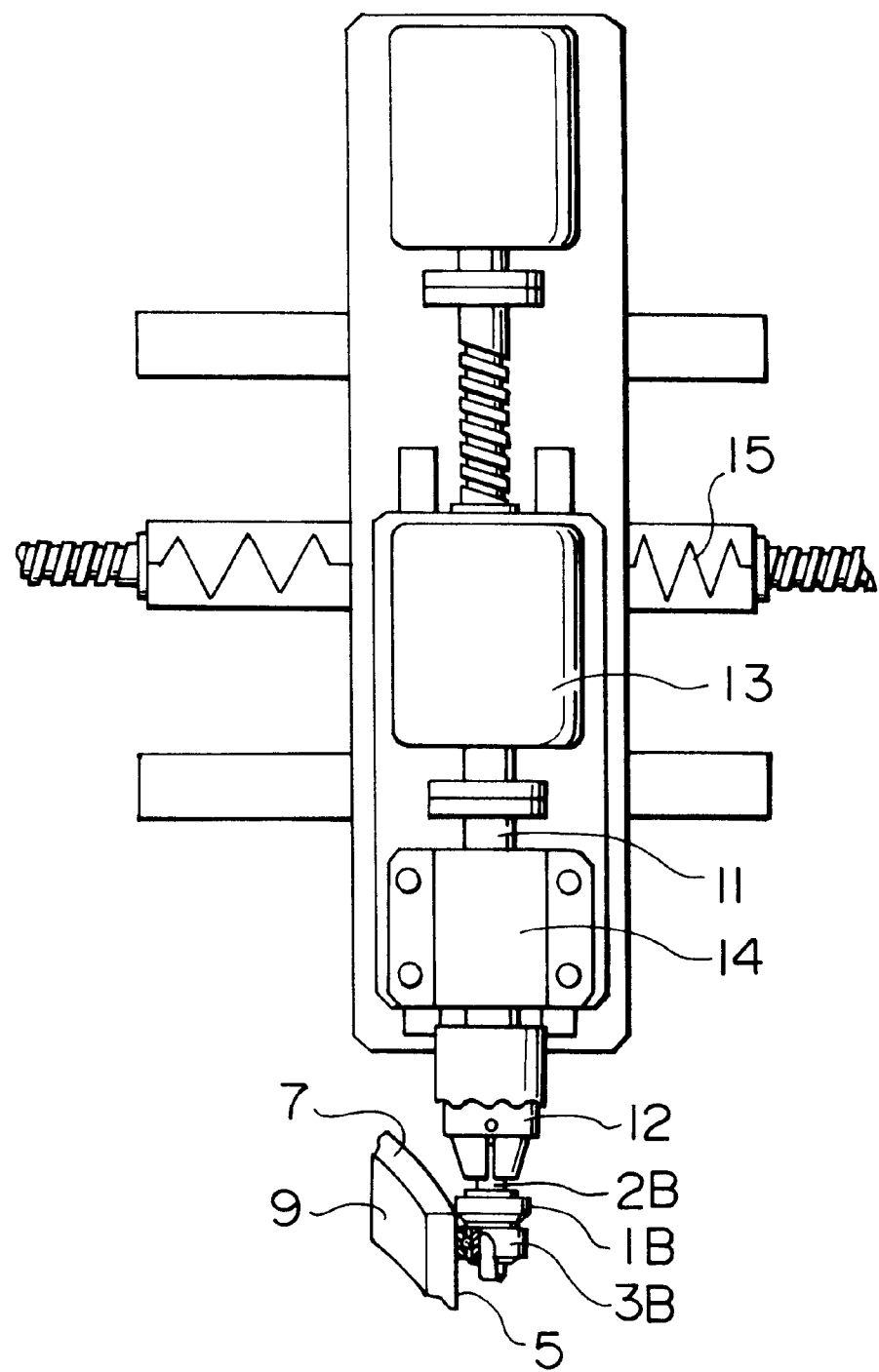
FIG. 4 is a diagram showing a tool and machine according to an embodiment of this invention.
Figure 5:
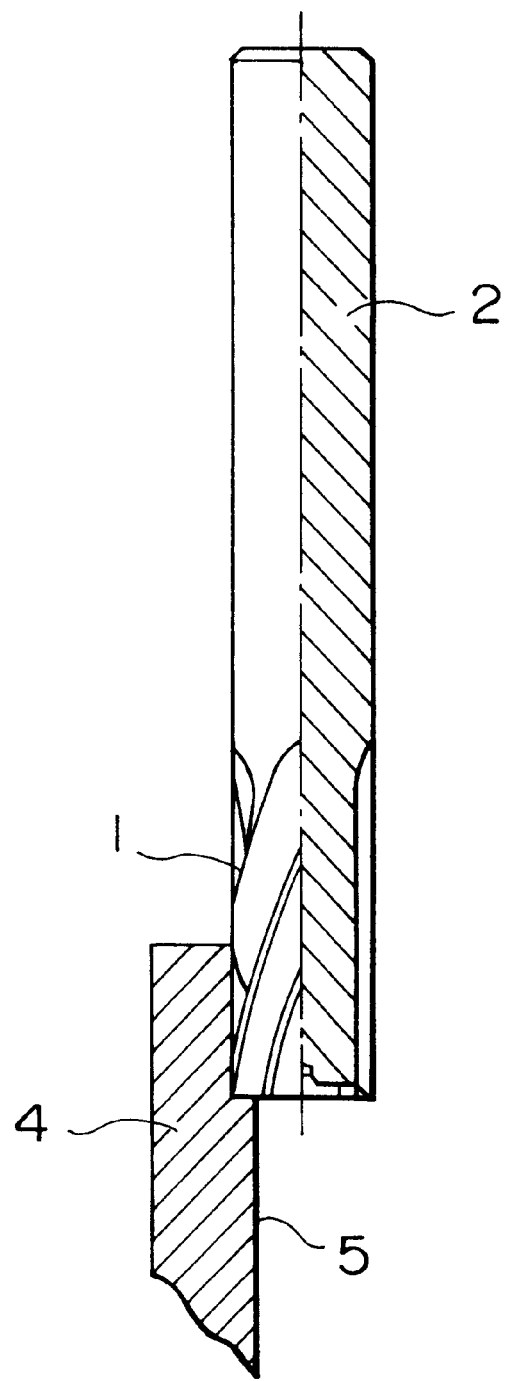
FIG. 5 is a sectional view of a conventional tool.
Figure 6:
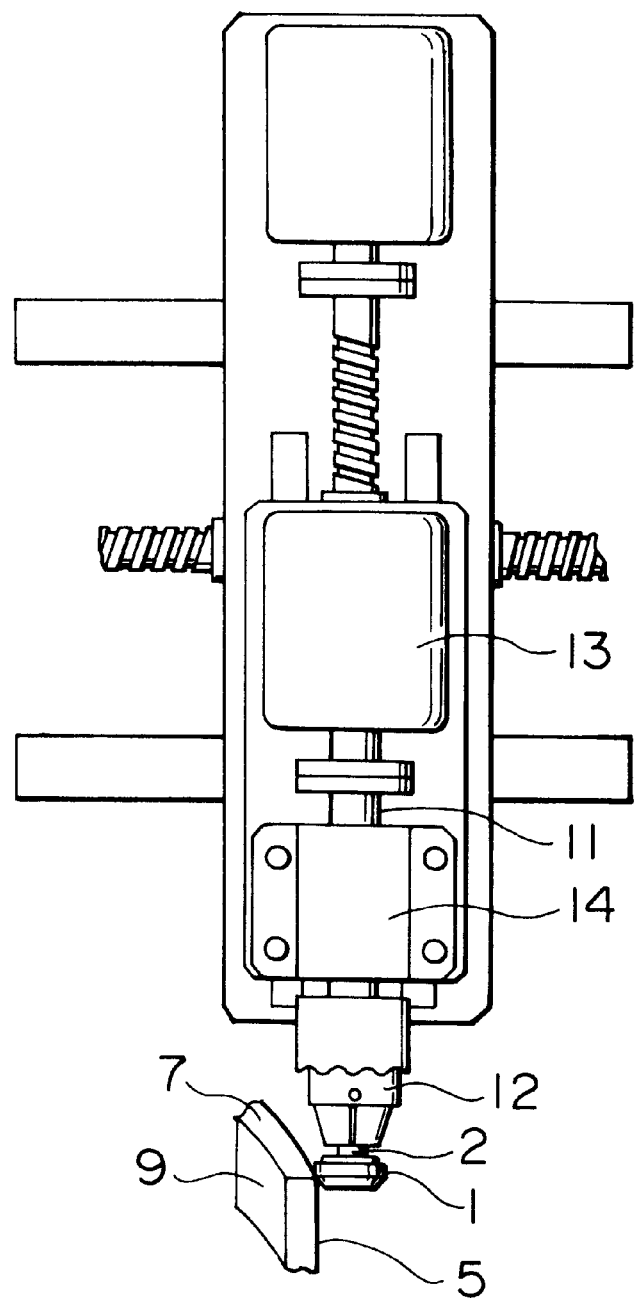
FIG. 6 is a diagram showing a machine for performing chamfering/profiling by using a conventional tool and method.

Further, as shown in FIG. 4, by attaching the rotary tool of the above embodiment to a machining apparatus, such profiling is further facilitated.

In the example shown in FIG. 4, high-precision chamfering (e.g., C 0.1±0.05) is performed on an edge portion between a side surface 5 and an upper end section 7 of a workpiece 9.

A cutter (a milling cutter) 1B, which is fastened to a shank 2B, is at an angle of 45° with respect to the axis of the tool (i.e., the axis of the shank section). A journal bearing 3B is provided to the side of the cutter 1B opposite to the shank section 2B. While the journal bearing used in this example consists of a ball bearing, a needle bearing, a roller bearing or a sliding bearing will also serve the purpose.

The other end of the shank 2B is joined to a chuck 12 at the tip of a machining apparatus 11, whose spindle is driven by a motor 13 and supported by a spindle bearing 14. The spindle, spindle bearing, etc. are supported by a spring member 15 which is movable perpendicularly to the axis of the tool.

When chamfering is to be performed on the upper end portion of the workpiece 9 by using the surface 5 as the reference surface, the cutter 1B is adjusted to a predetermined dimension with respect to the outer peripheral surface of the journal bearing 3B. The dimension of the cutter in the vertical direction (in the Z-direction) is fixed with respect to the workpiece, and the spindle of the machining apparatus is moved in accordance with a roughly predetermined X/Y-program (one of the X and Y-axes is not shown).

This X/Y program is set substantially in accordance with the the profiling surface 5 of the workpiece. If the outer surface of the workpiece exhibits a considerable variation with respect to the reference profile, as is the case with a cast surface, or if the workpiece is positioned and secured onto the jig imperfectly to cause some deviation from the reference co-ordinates, there is no need to modify the program.

When the machining apparatus is operated in this condition, the spindle moves in such a way as to draw a profile substantially in conformity with the profiling reference surface 5 of the workpiece 9. Since the outer surface of the journal bearing 3 at the tip of the cutter is moved while it is pressed against the profiling reference surface 5, the positional relationship between the outer surface of the journal bearing and the cutter 1 is fixed, thereby making it possible to perform machining in conformity with the profiling reference surface even if the latter is a cast surface having a rather poor configurational precision.

Further, if the workpiece is mounted with rather poor accuracy, it is possible to shape the workpiece into a chamfered configuration which generally exhibits a high level of precision. Accordingly, there is no need to specially consider the accuracy with which the workpiece is mounted on the jig, thereby substantially reducing the requisite mounting time. Further, since a very high level of precision is not required of the mounting jig, it is possible to use a relatively inexpensive jig.

In another embodiment of this invention, a 3-shaft machining apparatus is used which includes: a shaft resiliently supported in such a way as to be movable perpendicularly to the tool axis; a vertically extending Z-shaft; and a rotating shaft provided on the workpiece side. This apparatus facilitates the machining of a workpiece having many curved portions.

In still another embodiment, a 4-shaft structure is adopted which is formed by further providing the structure of FIG. 1 with a rotating shaft arranged on the workpiece side. This structure enables a workpiece to be shaped by machining into a more complicated configuration.

The method of the present invention proves effective in performing chamfering with high accuracy on a profile with a complicated configuration, as in the case of the chamfering of the end surface of the wrap of a scroll compressor.

What is claimed is:

1. A method for profiling a spiral lap of a scroll compressor, said method comprising:
   (a) providing a rotary tool having a shank comprising a rotary cutter and a rotatable journal bearing rotatably attached to an end of the shank, said rotatable journal bearing comprising an inner sleeve attached to a tip of said cutter and being separate from said shank, an outer sleeve disposed around the inner sleeve, and bearing elements disposed between the inner sleeve and the outer sleeve, and a spindle for driving said shaft, said spindle being resiliently supported to be movable perpendicular to a longitudinal axis of said tool;

(b) chucking the shank of said rotary tool a single time for profiling an entirety of said spiral lap;

(c) setting said rotary tool upright on an end surface of said spiral lap; and (d) chamfering an edge surface of said spiral lap by pressing said rotatable journal bearing against a side surface of said spiral lap as a reference.

2. A method for profiling a spiral lap of a scroll compressor according to claim 1, wherein an amount of chamfering in step (d) is decreased by vertically adjusting said rotary tool in an upward direction away from an upper end surface of said spiral lap.

3. A method for profiling a spiral lap of a scroll compressor according to claim 1, wherein an amount of chamfering in step (d) is increased by vertically adjusting said rotary tool in a downward direction toward an upper end surface of said spiral lap.

4. A method for profiling a spiral lap of a scroll compressor according to claim 1, wherein the side surface of said spiral lap is an unprocessed surface formed by one of forging, casting, and resin molding.

5. A method for profiling a spiral lap of a scroll compressor according to claim 1, wherein said journal bearing has an outer diameter which is equal to or smaller than an outer diameter of said rotary cutter.

* * * * *